(12) United States Patent
Gupta et al.

(10) Patent No.: US 8,782,769 B2
(45) Date of Patent: Jul. 15, 2014

(54) SYSTEM AND METHOD FOR PROVIDING A REST-BASED MANAGEMENT SERVICE IN A TRAFFIC DIRECTOR ENVIRONMENT

(71) Applicant: Oracle International Corporation, Redwood Shores, CA (US)

(72) Inventors: Amit Gupta, Bangalore (IN); Praveen Chandrasekharan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/627,646

(22) Filed: Sep. 26, 2012

(65) Prior Publication Data

US 2013/0081128 A1    Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.
*G06F 7/04* (2006.01)

(52) U.S. Cl.
USPC ....... 726/9; 726/5; 713/172; 705/65; 380/229

(58) Field of Classification Search
None
See application file for complete search history.

(56) References Cited

U.S. PATENT DOCUMENTS

| | | | |
|---|---|---|---|
| 6,691,244 B1 | 2/2004 | Kampe et al. | |
| 7,158,926 B2* | 1/2007 | Kampe | 703/22 |
| 7,321,926 B1 | 1/2008 | Zhang et al. | |
| 7,370,083 B2 | 5/2008 | Husain et al. | |
| 7,664,948 B2* | 2/2010 | Moreau | 713/156 |
| 2002/0087694 A1 | 7/2002 | Daoud et al. | |
| 2002/0152307 A1* | 10/2002 | Doyle et al. | 709/225 |
| 2003/0051055 A1* | 3/2003 | Parrella et al. | 709/246 |
| 2005/0188295 A1* | 8/2005 | Konkus et al. | 715/500 |
| 2005/0262183 A1* | 11/2005 | Colrain et al. | 709/200 |

(Continued)

FOREIGN PATENT DOCUMENTS

| | | |
|---|---|---|
| GB | 2 360 369 A | 9/2001 |
| WO | 02/07037 | 1/2002 |
| WO | 03/105004 | 12/2003 |
| WO | 2004/008334 | 1/2004 |

OTHER PUBLICATIONS

Wikipedia, HTTP Compression, pp. 1-2, http://en.wikipedia.org/w/index.php?title=HTTP_compression&oldid=450858133, Sep. 16, 2011.

(Continued)

*Primary Examiner* — Philip Chea
*Assistant Examiner* — Khoi Le
(74) *Attorney, Agent, or Firm* — Meyer IP Law Group

(57) ABSTRACT

Described herein are systems and methods for providing software administration tools, for use in administering server configurations, such as in a traffic director or other type of server environment. In accordance with an embodiment, the system comprises a traffic director having one or more traffic director instances, which is configured to receive and communicate requests, from clients, to origin servers having one or more pools of servers. An administration server can be used to manage the traffic director, including a REpresentational State Transfer (REST) infrastructure and management service which maps REST calls to mbeans or other management components registered on the administration server, for use in managing the traffic director.

12 Claims, 4 Drawing Sheets

(56) References Cited

U.S. PATENT DOCUMENTS

| | | | |
|---|---|---|---|
| 2006/0190579 A1 | 8/2006 | Rachniowski et al. | |
| 2007/0005801 A1* | 1/2007 | Kumar et al. | 709/238 |
| 2007/0169049 A1 | 7/2007 | Gingell et al. | |
| 2007/0174660 A1 | 7/2007 | Peddada | |
| 2007/0226359 A1 | 9/2007 | Gunduc et al. | |
| 2008/0133536 A1* | 6/2008 | Bjorner et al. | 707/10 |
| 2009/0204885 A1 | 8/2009 | Ellsworth et al. | |
| 2009/0328054 A1* | 12/2009 | Paramasivam et al. | 718/105 |
| 2010/0070561 A1 | 3/2010 | Dhoolia et al. | |
| 2010/0235484 A1 | 9/2010 | Bolan et al. | |
| 2011/0107136 A1 | 5/2011 | Jonnagadla et al. | |
| 2011/0145786 A1 | 6/2011 | Fayed et al. | |

OTHER PUBLICATIONS

Method and System for Displaying Graphical Objects in a Command Line Interface (CLI) Terminal, ip.com Journal, ip.com Inc., West Henrietta, NY, US, Feb. 18, 2010.

Elkstein, Dr. M., 14.3 How Do I Handle Authentication in REST?, Aug. 26, 2011, http://web.archive.org/web/20110826023142/http://rest.elkstein.org/2008/01/how-do-i-handle-authentication-in-rest.html, retrieved Apr. 24, 2013.

International Searching Authority, International Search Report and Written Opinion for PCT International Patent Application No. PCT/US2012/057370, May 31, 2013, 17 pages.

International Searching Authority, International Search Report and Written Opinion for PCT International Patent Application No. PCT/US2012/057373, Feb. 14, 2013, 13 pages.

International Searching Authority, International Search Report and Written Opinion for PCT International Application No. PCT/US2012/057375, May 24, 2013, 19 pages.

International Searching Authority, International Search Report and Written Opinion for PCT International Application No. PCT/US2012/057620, Jun. 5, 2013, 22 pages.

* cited by examiner

SYSTEM AND METHOD FOR PROVIDING A REST-BASED MANAGEMENT SERVICE IN A TRAFFIC DIRECTOR ENVIRONMENT

COPYRIGHT NOTICE

A portion of the disclosure of this document contains material which is subject to copyright protection. The copyright owner has no objection to the facsimile reproduction by anyone of the document or the disclosure, as it appears in the and Trademark Office file or records, but otherwise reserves all copyright rights whatsoever.

CLAIM OF PRIORITY

This application claims the benefit of priority to U.S. Provisional Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

FIELD OF INVENTION

The invention is generally related to software administration tools, for use in administering server configurations, and is particularly related to a system and method for providing a rest-based management service in a traffic director or other type of server environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for providing software administration tools, for use in administering server configurations, such as in a traffic director or other type of server environment. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

In accordance with an embodiment, the system comprises a traffic director having one or more traffic director instances, which is configured to receive and communicate requests, from clients, to origin servers having one or more pools of servers. An administration server can be used to manage the traffic director, including a REpresentational State Transfer (REST) infrastructure and management service which maps REST calls to mbeans or other management components registered on the administration server, for use in managing the traffic director. Embodiments of the invention can also be used with other types of server environment.

DETAILED DESCRIPTION

Figure 1:
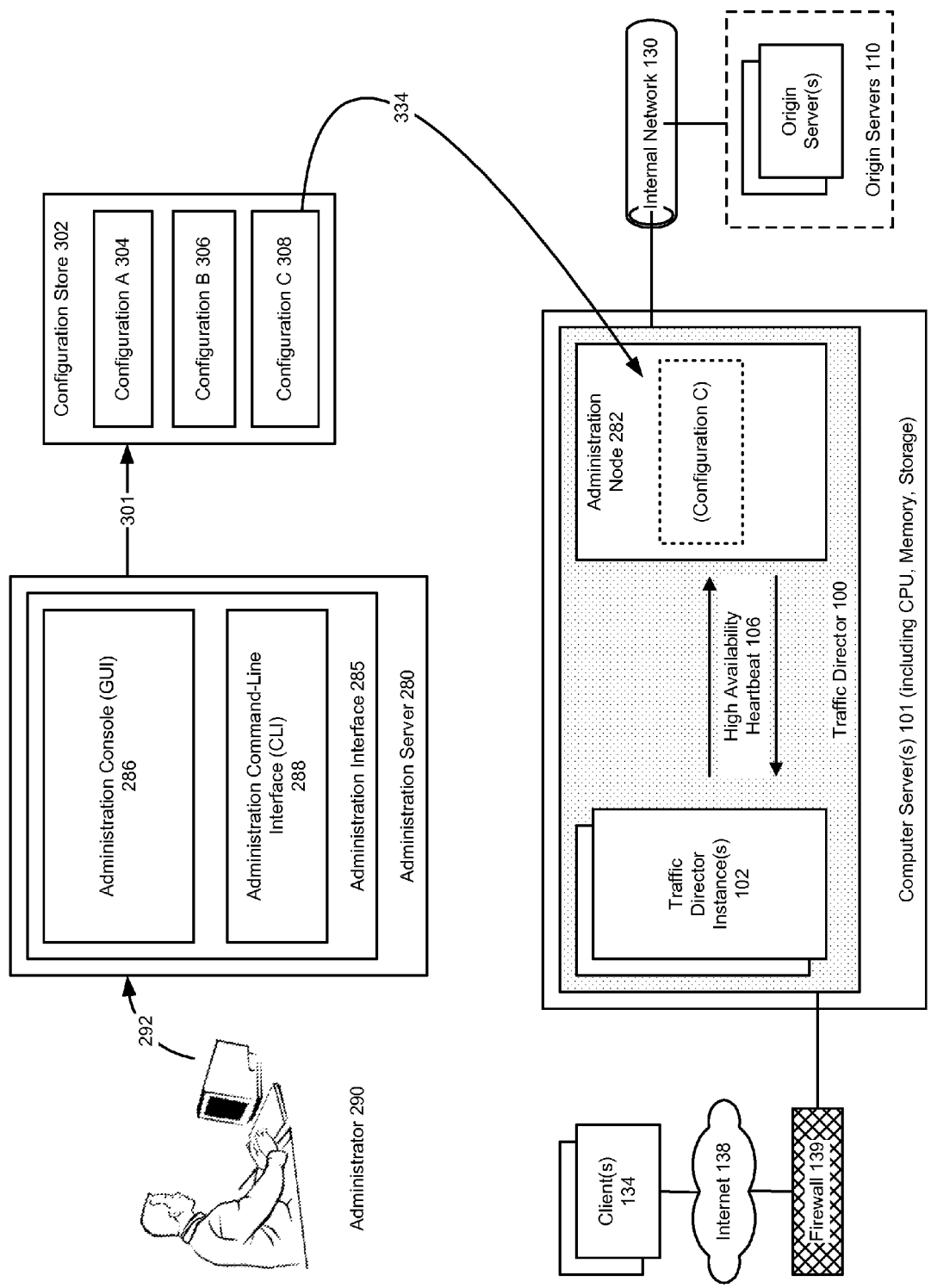
FIG. 1 illustrates a computing environment which includes a server environment, such as a load balancer or traffic director, which can be managed using a rest-based management service, in accordance with an embodiment.

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. It is also desirable to be able to manage or administer such systems efficiently and securely.

Described herein are systems and methods for providing software administration tools for use in administering server configurations, and in particular a system and method for providing a rest-based management service. In accordance with an embodiment, the systems and methods can be used with a server environment such as a traffic director, referred to herein in some embodiments as "Oracle Traffic Director" (OTD), which is provided as a software-based load balancer that can be used to deliver Internet and other traffic to back-end origin servers, such as web servers, application servers, or other resource servers.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs.

GLOSSARY

In accordance with an embodiment, the following terms are used herein. It will be evident that, in accordance with other embodiments, additional and/or different terms can be used. Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP).

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

FIG. 1 illustrates a computing environment which includes a server environment, such as a load balancer or traffic director, which can be managed using a rest-based management service, in accordance with an embodiment. As shown in FIG. 1, in accordance with an embodiment, a server environment (e.g., a traffic director 100) can be deployed on one or more physical computer servers 101 or similar computing devices that include a processor (CPU), memory, and storage, and can include one or more server instances (e.g., traffic director instances 102), which in turn can communicate with one another using a high-availability heartbeat or similar means 106.

In accordance with an embodiment, the back-end can include one or more origin servers 110. Each of the origin servers can communicate with one another, and with the traffic director, via an internal network 130 such as an Ethernet network. The traffic director can receive requests from clients 134, via the Internet 138, and in the case of many organizations a firewall 139.

In accordance with an embodiment, from an administration perspective, the server environment is designed to be easy to install, configure, and use; and can include a simple, wizard-driven graphical interface, as well as a robust command-line interface, for use by an administrator in managing server instances. At least one of the server instances can be designated an administration node 282. An administration server 280 includes an administration interface 285, which in turn includes one or more of an administration console (GUI) 286 and/or a command line interface 288, that enables an administrator 290 to configure or otherwise administer 292 the server environment or its server instances.

In accordance with an embodiment, a configuration is a collection of configurable elements that determines the run-time behavior of a server instance. A typical configuration may contain, e.g., definitions for listeners on which the traffic director should listen for requests, together with information about servers at the back-end to which the requests should be sent. The server environment, e.g., traffic director, can read the configuration when a server instance starts, and while processing client requests. An administrator can define 301 configurations 304, 306, 308 for server instances, which are stored in a configuration store 302 on the administration server. The administrator can then instantiate a configuration by deploying it 334 on one or more administration nodes.

It will be evident that the example shown in FIG. 1 is provided for purposes of illustration and that, in accordance with other embodiments, different types of server environment, and different deployment scenarios can be used.

REST Infrastructure and Management Service

In accordance with an embodiment, the server environment (e.g., traffic director environment) includes a REpresentational State Transfer (REST) infrastructure and management service, which enables management of the environment, while at the same time allowing flexible evolution of the REST interfaces and the back-end data model. The REST infrastructure maps HTTP REST calls to respective mbeans, or other management components, that are registered on the administration server. In accordance with an embodiment, a Java web application or REST web service can be deployed on the administration server and can expose a set of REST APIs, most of which finally map to their respective mbeans or management components registered on the administration server, while others return web application specific data, e.g., information about a session, or information about a logged-in user.

In accordance with an embodiment, a HTTP request is handled by the REST infrastructure as follows:

GET/POST JSON request->RESTServlet->REST-Handler->JSON response wherein the REST URI space is of the format:

/admin/<action> and wherein the action can be, e.g., a login, logout, list-configs, get-config-prop, or another action. In accordance with an embodiment, a typical REST request/response will then look similar to that shown below:

```
// request
GET /admin/get-config-prop?config=www.example.com HTTP/1.0
X-Auth-Token: 3f8b14d6-fdca-4bdd-b43b-a366de853c69
Cookie: JSESSIONID=91A3BF1B3E32B0FE88330D6385FDB4F8;
Path=/admin;
HttpOnly
// response
HTTP/1.1 200 OK
Server: Oracle-Traffic-Director/11.1.1.6
Content-type: application/json;charset=UTF-8
Content-length: 65
Connection: close
{"platform":"64","temp-path":"/tmp/net-www.example.com-60a02e2e"}
```

Figure 2:
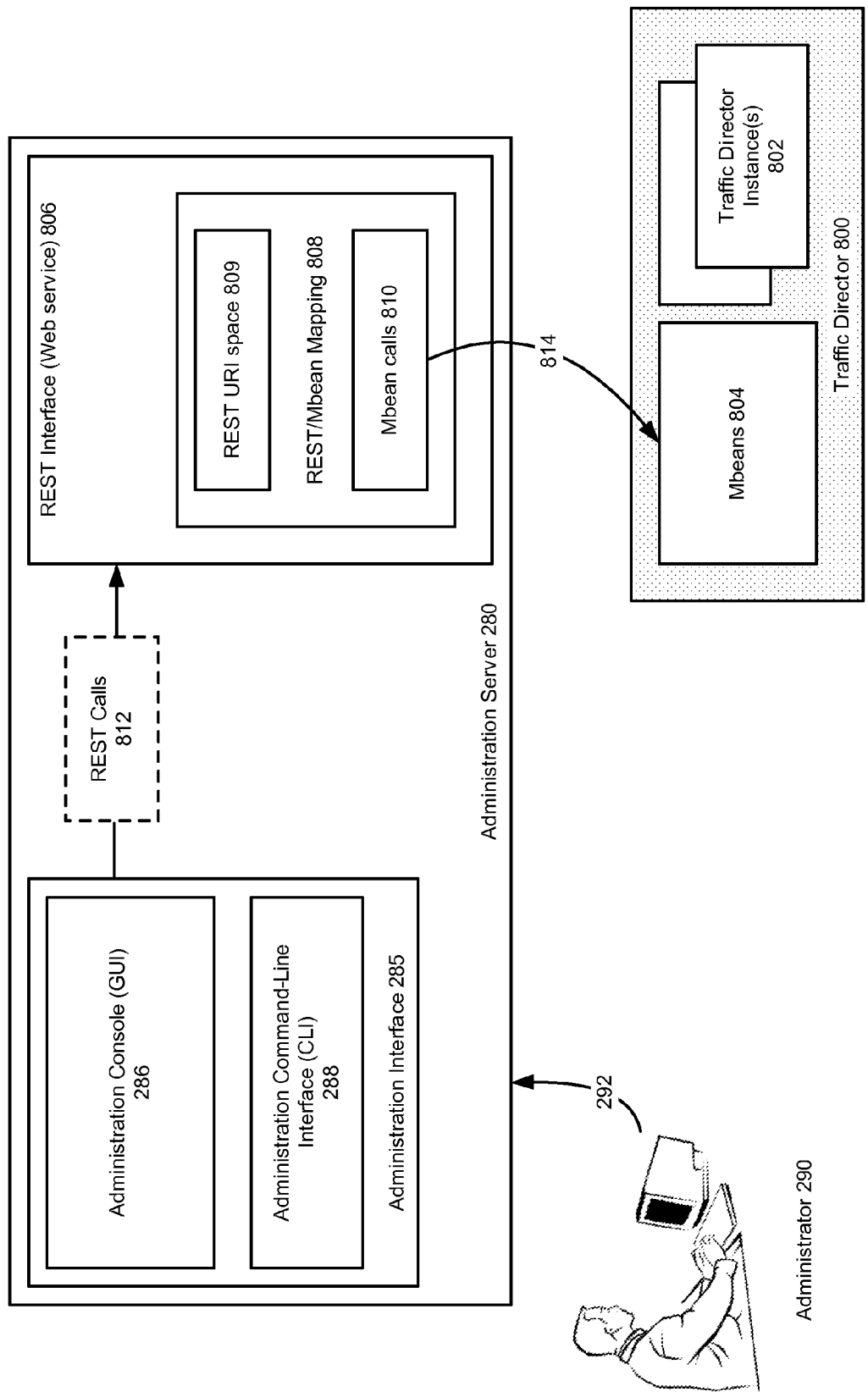
FIG. 2 illustrates a REST interface, in accordance with an embodiment.

FIG. 2 illustrates a REST interface, in accordance with an embodiment. As shown in FIG. 2, a server environment is provided, including a traffic director 800 having one or more traffic director instances 802, wherein the traffic director and its instances can be configured or managed using mbeans 804, or other management components.

As further shown in FIG. 2, an administration server 280 includes an administration interface 285, including one or more of an administration console (GUI) 286 and/or command-line interface 288, which allows an administrator 290 to configure or manage the server environment.

In accordance with an embodiment, the administration server includes a REST interface (e.g., a Java web application or REST web service) 806, which provides a mapping 808 between a REST URI space 809 and respective mbean calls 810. When an administrator using the administration interface, or another entity, communicates a management request as a REST call 812 to the REST interface, the system maps that call to mbean calls 814, for use in configuring or managing the server environment, including, e.g., the traffic director or instances therein.

REST-Based Authentication

In accordance with an embodiment, the system can also support the use of customized HTTP headers to protect the REST web service API from potential Cross-Site Request Forgery (CSRF) exploits. Through the use of customized HTTP headers conveying user-specific tokens, the administration server can assert the authenticity of clients invoking a management operation.

In accordance with an embodiment, most of the REST APIs are protected and hence require authentication, which can be provided through the use of a password-based authentication. For example, a REST API/admin/login can be provided to login using appropriate credentials, e.g., a username and password, or traffic director administration server credentials, such as that shown below:

```
// request
POST /admin/login HTTP/1.0
Content-Type: application/json
Content-Length: 45
{"username":"admin", "password":"<passwd>"}
// response
HTTP/1.1 200 OK
Server: Oracle-Traffic-Director/11.1.1.6
Content-type: text/html
Set-x-auth-token: 3f8b14d6-fdca-4bdd-b43b-a366de853c69
Content-length: 0
Set-cookie: JSESSIONID=91A3BF1B3E32B0FE88330D6385FDB4F8;
Path=/admin ; HttpOnly
Connection: close
```

In accordance with an embodiment, the response of the login action includes an X-Auth-Token, which then must be passed with any subsequent requests. This allows the X-Auth-Token header to be used to prevent CSRF attacks:

```
// request
POST /admin/get-config-prop HTTP/1.0
Content-Type: application/json
Content-Length: 28
X-Auth-Token: 3f8b14d6-fdca-4bdd-b43b-a366de853c69
Cookie: JSESSIONID=91A3BF1B3E32B0FE88330D6385FDB4F8;
Path=/admin ; HttpOnly
{"config":"www.example.com"}
// response
HTTP/1.1 200 OK
Server: Oracle-Traffic-Director/11.1.1.6
Content-type: application/json;charset=UTF-8
Content-length: 65
Connection: close
{"platform":"64","temp-path":"/tmp/net-www.example.com-60a02e2e"}
```

Figure 3:
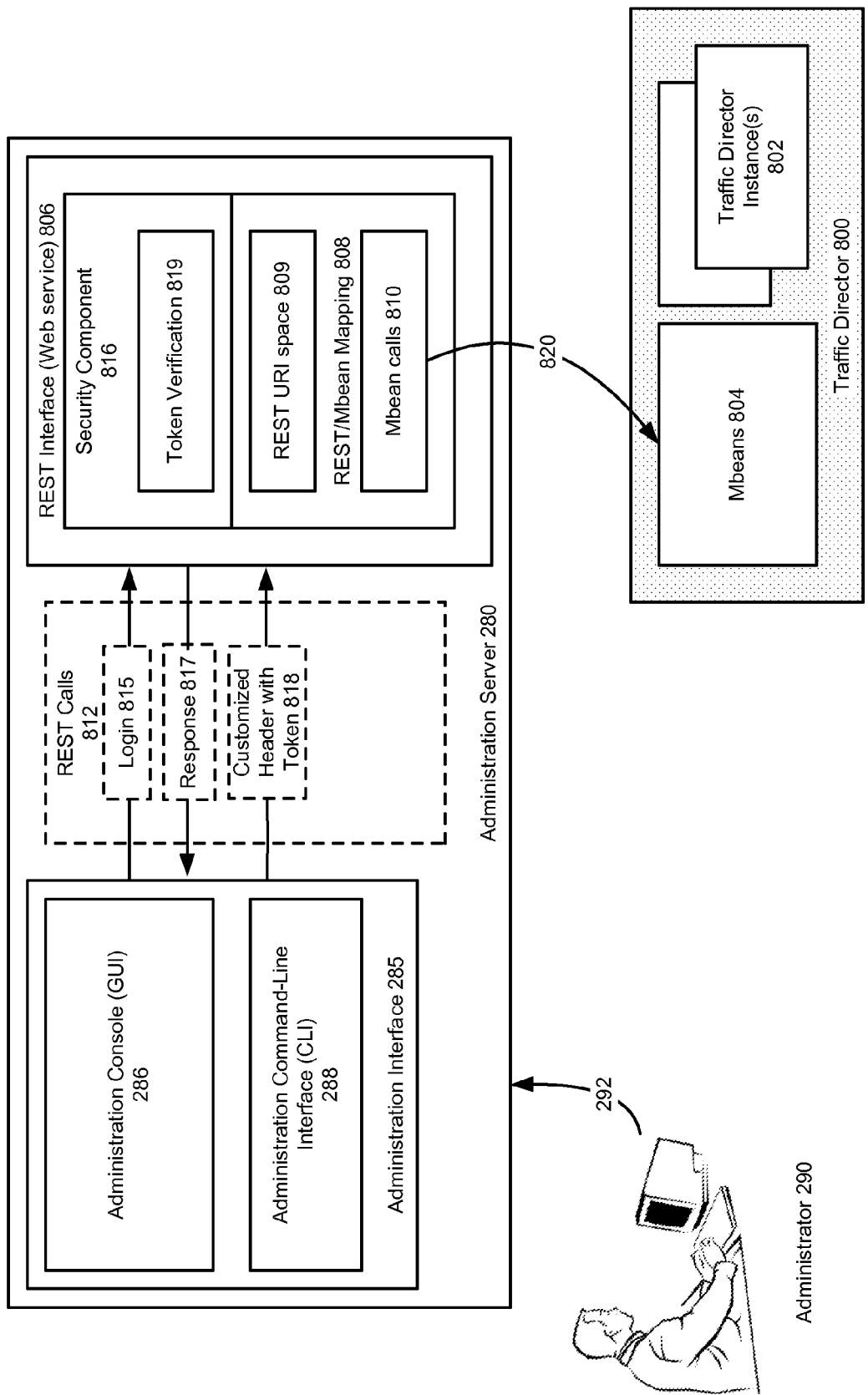
FIG. 3 illustrates use of a REST interface with customized header tokens, in accordance with an embodiment.

FIG. 3 illustrates use of a REST interface with customized header tokens, in accordance with an embodiment. As shown in FIG. 3, a traffic director environment is again provided, including the traffic director 800 having one or more traffic director instances 802, wherein the traffic director and its instances can be configured or managed using mbeans 804, or other management component. The administration server 280 again includes an administration interface 285, including one or more of a traffic director administration console (GUI) 286 and/or a traffic director command-line interface 288.

In accordance with an embodiment, the administration server includes a REST interface (e.g., a Java web application or REST web service) 806, which provides a mapping 808 between a REST URI space 809 and respective mbean calls 810, and also includes a security component 816.

When an administrator using the administration interface, or another entity, communicates a management request as a REST call 812 to the REST interface, they must first login or otherwise authenticate themselves 815 with the security component. In response 817, they receive a token (which in accordance with an embodiment is an X-Auth-Token).

Thereafter, with each management request/REST call to the administrator server, the token must be included as part of the request header 818. The security component can then verify the token 819, prior to passing the management request as an mbean call 820 to the traffic director environment.

Figure 4:
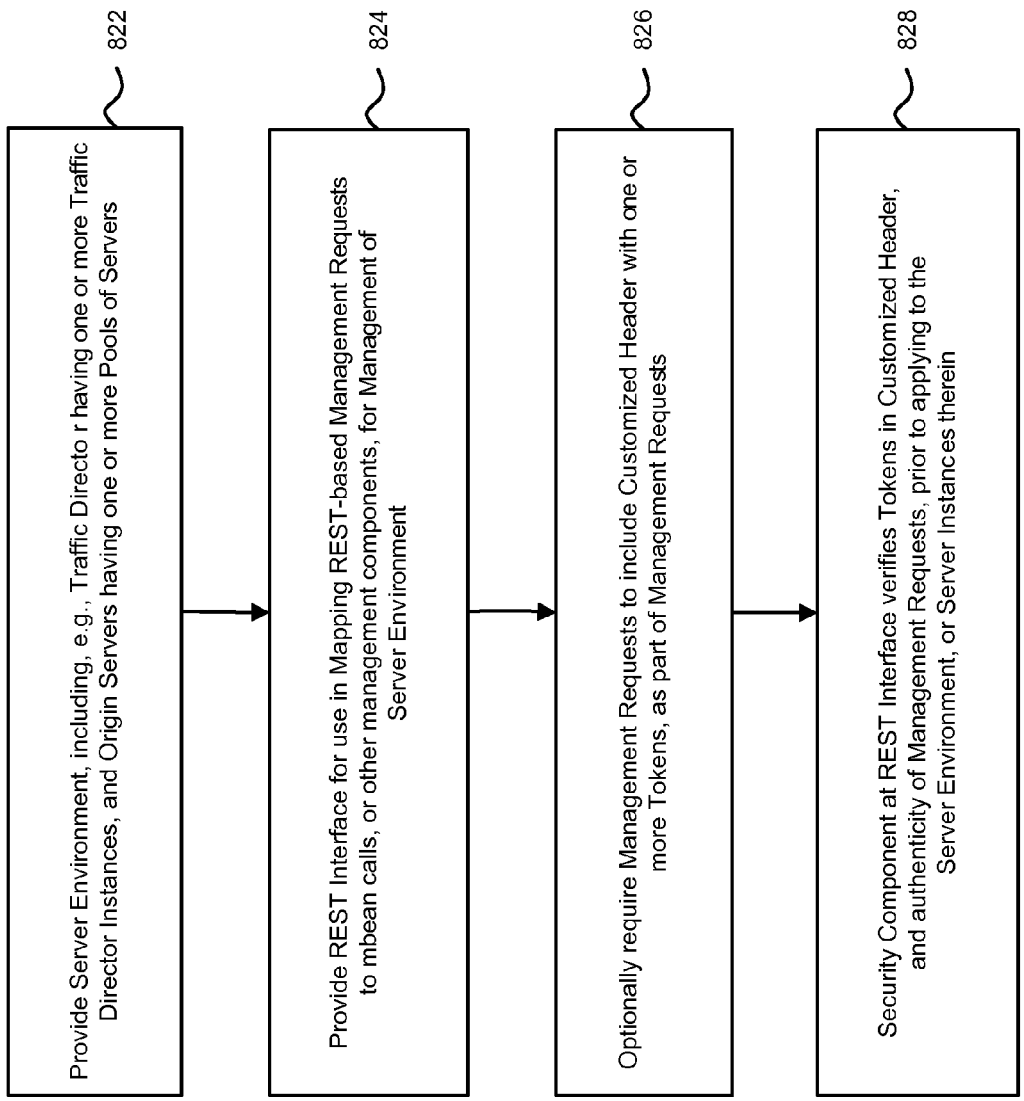
FIG. 4 is a flowchart of a method for using a REST interface, optionally with customized header tokens, in accordance with an embodiment.

FIG. 4 is a flowchart of a method for using a REST interface, optionally with customized header tokens, in accordance with an embodiment. As shown in FIG. 4, at step 822, a server environment (e.g., traffic director environment) is provided, including, e.g., a traffic director having one or more traffic director instances, and origin servers having one or more pools of servers.

At step 824, a REST interface is provided (e.g., as a web service), which maps REST calls to mbean calls, for use in configuring or managing the server environment.

At step 826, depending on the particular embodiment, the system can require that management requests received from clients include a customized header with one or more tokens as part of those management requests.

At step 828, a security component can be provided at the REST interface to check for the presence of the token in the customized header, and to verify the authenticity of the management request, prior to allowing that request to be applied to the server environment, or server instances therein.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in a computing environment which includes a traffic director component, comprising:
    one or more computer servers, operating as a traffic director environment, and having one or more server instances, wherein the server instances are managed using one or more mbeans or other management software components;
    an administration server, which is used to manage the traffic director environment, wherein the administration server includes a configuration store having a collection of configurable elements that determine a run-time behavior of the server instances; and
    a REpresentational State Transfer (REST) infrastructure and management service provided at the administration server, which maps REST calls received from administration consoles or other user interfaces to the mbeans or other management software components registered on the administration server, for use in managing the traffic director environment, including
        maintaining a mapping between a REST space and calls to the mbeans or other management software components,
        receiving a management request as a REST call, and
        verifying presence of a security token in the REST call, prior to passing the management request to the traffic director environment as a call to the mbeans or other management software components;
    wherein the REST infrastructure includes a security component which requires entities communicating a management request to first login or otherwise authenticate themselves with the security component, wherein in response to authenticating with the security component, the entity receives the security token, which must be included as part of the request header for subsequent management requests.

2. The system of claim 1, wherein the REST infrastructure and management service includes a web service which provides the mapping between a REST URI space and respective mbean calls.

3. The system of claim 1, wherein the administration server uses customized request headers and tokens to assert the authenticity of clients invoking management operations.

4. The system of claim 1, wherein the server instances are traffic director instances.

5. A method for use in a computing environment which includes a traffic director component, comprising the steps of:
    operating, at one or more computer servers, a traffic director environment, having one or more server instances, wherein the server instances are managed using one or more mbeans or other management software components;
    providing an administration server, which is used to manage the traffic director environment, wherein the administration server includes a configuration store having a collection of configurable elements that determine a run-time behavior of the server instances; and
    providing a REpresentational State Transfer (REST) infrastructure and management service provided at the administration server, which maps REST calls received from administration consoles or other user interfaces to the mbeans or other management software components registered on the administration server, for use in managing the traffic director environment, including
        maintaining a mapping between a REST space and calls to the mbeans or other management software components,
        receiving a management request as a REST call, and
        verifying presence of a security token in the REST call, prior to passing the management request to the traffic director environment as a call to the mbeans or other management software components;

wherein the REST infrastructure includes a security component which requires entities communicating a management request to first login or otherwise authenticate themselves with the security component, wherein in response to authenticating with the security component, the entity receives the security token, which must be included as part of the request header for subsequent management requests.

6. The method of claim 5, wherein the REST infrastructure and management service includes a web service which provides the mapping between a REST URI space and respective mbean calls.

7. The method of claim 5, wherein the administration server uses customized request headers and tokens to assert the authenticity of clients invoking management operations.

8. The method of claim 5, wherein the server instances are traffic director instances.

9. A non-transitory computer readable medium, including instructions stored thereon which when read and executed by one or more computers cause the one or more computers to perform the steps comprising:

operating, at one or more computer servers, a traffic director environment, having one or more server instances, wherein the server instances are managed using one or more mbeans or other management software components;

providing an administration server, which is used to manage the traffic director environment, wherein the administration server includes a configuration store having a collection of configurable elements that determine a runtime behavior of the server instances; and providing a REpresentational State Transfer (REST) infrastructure and management service provided at the administration server, which maps REST calls received from administration consoles or other user interfaces to the mbeans or other management software components registered on the administration server, for use in managing the traffic director environment, including maintaining a mapping between a REST space and calls to the mbeans or other management software components, receiving a management request as a REST call, and verifying presence of a security token in the REST call, prior to passing the management request to the traffic director environment as a call to the mbeans or other management software components;

wherein the REST infrastructure includes a security component which requires entities communicating a management request to first login or otherwise authenticate themselves with the security component, wherein in response to authenticating with the security component, the entity receives the security token, which must be included as part of the request header for subsequent management requests.

10. The non-transitory computer readable medium of claim 9, wherein the REST infrastructure and management service includes a web service which provides the mapping between a REST URI space and respective mbean calls.

11. The non-transitory computer readable medium of claim 9, wherein the administration server uses customized request headers and tokens to assert the authenticity of clients invoking management operations.

12. The non-transitory computer readable medium of claim 9, wherein the server instances are traffic director instances.

* * * * *

UNITED STATES PATENT AND TRADEMARK OFFICE
CERTIFICATE OF CORRECTION

Page 1 of 1

PATENT NO. : 8,782,769 B2
APPLICATION NO. : 13/627646
DATED : July 15, 2014
INVENTOR(S) : Gupta et al.

It is certified that error appears in the above-identified patent and that said Letters Patent is hereby corrected as shown below:

In the Drawings

On sheet 4 of 4, in figure 4, under Reference Numeral 822, line 1, delete "Directo r" and insert -- Director --, therefor.

Signed and Sealed this
Tenth Day of March, 2015

Michelle K. Lee
*Deputy Director of the United States Patent and Trademark Office*